(12) United States Patent
Landrum et al.

(10) Patent No.: US 8,500,378 B1
(45) Date of Patent: Aug. 6, 2013

(54) LARGE TOWER RAILROAD TRANSPORTATION SYSTEM AND METHOD

(75) Inventors: Scott C. Landrum, Southlake, TX (US); Eric B. Thompson, North Richland Hills, TX (US)

(73) Assignee: Transportation Technology Services, Inc, Southlake, TX (US)

( * ) Notice: Subject to any disclaimer, the term of this patent is extended or adjusted under 35 U.S.C. 154(b) by 92 days.

(21) Appl. No.: 13/179,669

(22) Filed: Jul. 11, 2011

Related U.S. Application Data

(63) Continuation-in-part of application No. 12/539,008, filed on Aug. 11, 2009, now Pat. No. 8,142,120.

(51) Int. Cl.
*B61D 3/16* (2006.01)
*B60P 3/40* (2006.01)

(52) U.S. Cl.
USPC .......................................................... 410/44

(58) Field of Classification Search
USPC ................. 410/49, 53, 82, 2, 36, 44–47, 101; 280/404, 400
See application file for complete search history.

(56) References Cited

U.S. PATENT DOCUMENTS

| | | | |
|---|---|---|---|
| 3,430,407 A * | 3/1969 | Berry ............................... | 52/689 |
| 3,648,622 A | 3/1972 | Lich | |
| 3,837,295 A | 9/1974 | Fedele | |
| 4,150,628 A | 4/1979 | Keldenich | |
| 4,341,494 A | 7/1982 | Fedele | |
| 4,365,919 A | 12/1982 | Mehki | |
| 4,375,860 A * | 3/1983 | Greaves, Jr. ................... | 220/565 |
| 4,844,672 A * | 7/1989 | Yurgevich ....................... | 410/54 |
| 5,114,288 A | 5/1992 | Langendorf et al. | |
| 5,562,390 A * | 10/1996 | Christenson .................. | 414/477 |
| 6,286,435 B1 | 9/2001 | Kassab et al. | |
| 6,422,795 B2 | 7/2002 | Holt et al. | |
| 6,546,878 B1 * | 4/2003 | Smith et al. ................... | 105/404 |
| 6,827,024 B2 | 12/2004 | Kassab et al. | |
| 7,210,882 B2 | 5/2007 | Anderson et al. | |
| 7,244,084 B2 * | 7/2007 | Anthony et al. ................ | 410/49 |
| 7,303,365 B2 | 12/2007 | Wobben | |
| 7,429,156 B2 | 9/2008 | Jensen | |
| 2004/0091346 A1 | 5/2004 | Wobben | |
| 2005/0031431 A1 | 2/2005 | Wobben | |
| 2005/0063795 A1 | 3/2005 | Jagos et al. | |
| 2006/0285937 A1 | 12/2006 | Wobben | |
| 2007/0189895 A1 | 8/2007 | Kootstra et al. | |
| 2007/0248431 A1 | 10/2007 | Jensen | |
| 2009/0169323 A1 | 7/2009 | Livingston | |

* cited by examiner

*Primary Examiner* — Glenn Dayoan
*Assistant Examiner* — Sunsurraye Westbrook
(74) *Attorney, Agent, or Firm* — Dan Brown Law Office; Daniel R. Brown

(57) ABSTRACT

A system for transporting tower with a first end, a second end, and an elongated portion, using a railcar with a deck for carrying a load. The system includes a first support means for disposition between the railcar and the tower at a first location, and that is adapted to support the tower above the deck. The system also includes a first saddle assembly with a base for resting upon the deck of the railcar, and a saddle that conforms to the shape of a large tower. The saddle assembly is adapted to support the tower above the deck. The system also includes a plastic spacer assembly, for disposition between the saddle of the first saddle assembly and a second location along the elongated portion of the tower, and that has a saddle rest that conforms to the shaped of the saddle, and that has a spacer saddle that conforms to the shape of the elongated portion of the tower at the second location.

17 Claims, 11 Drawing Sheets

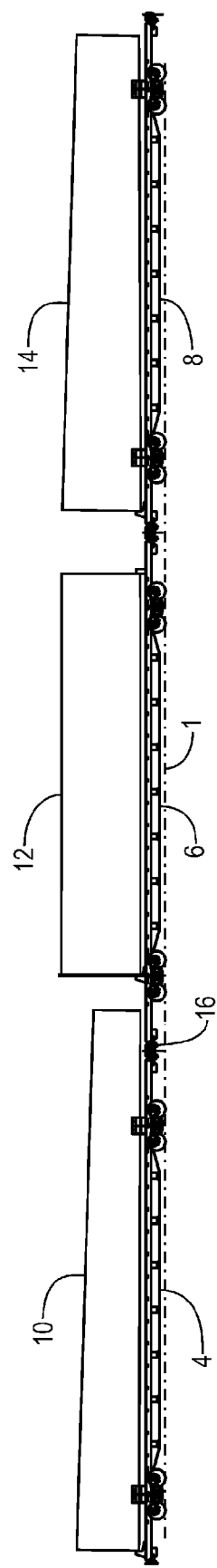

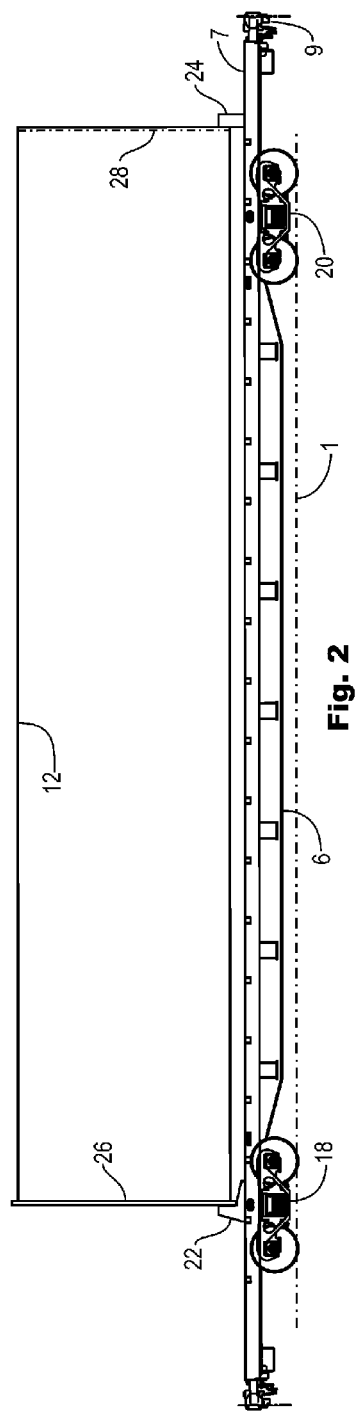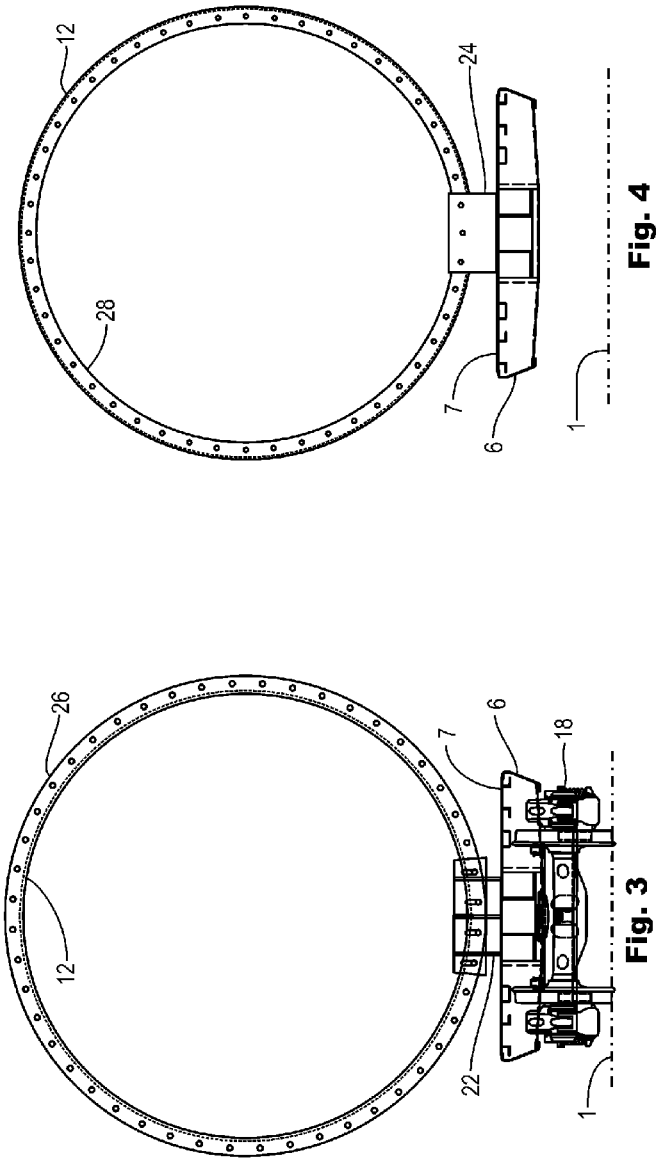

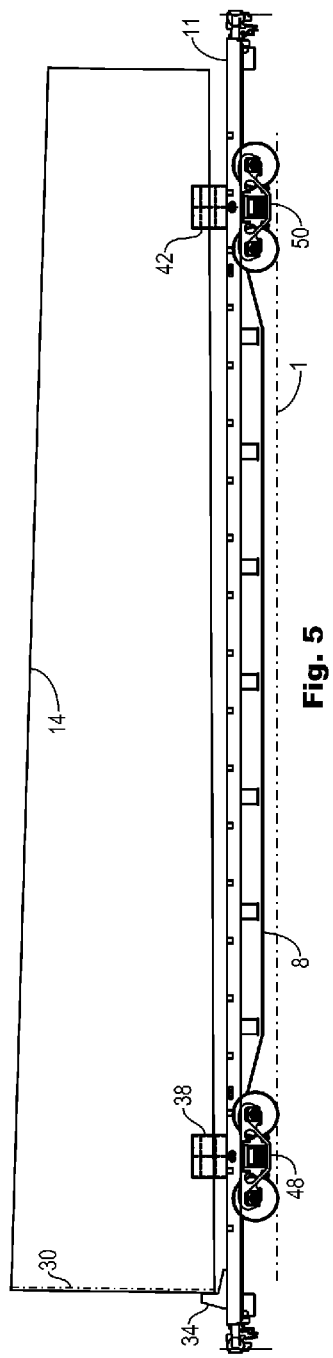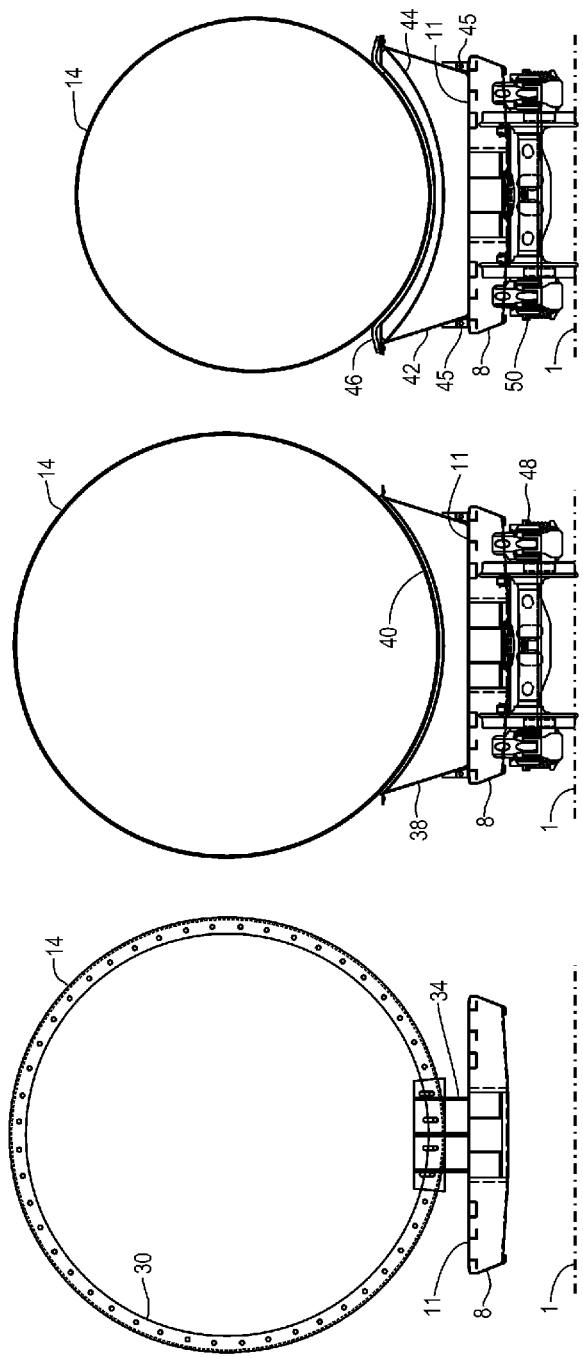

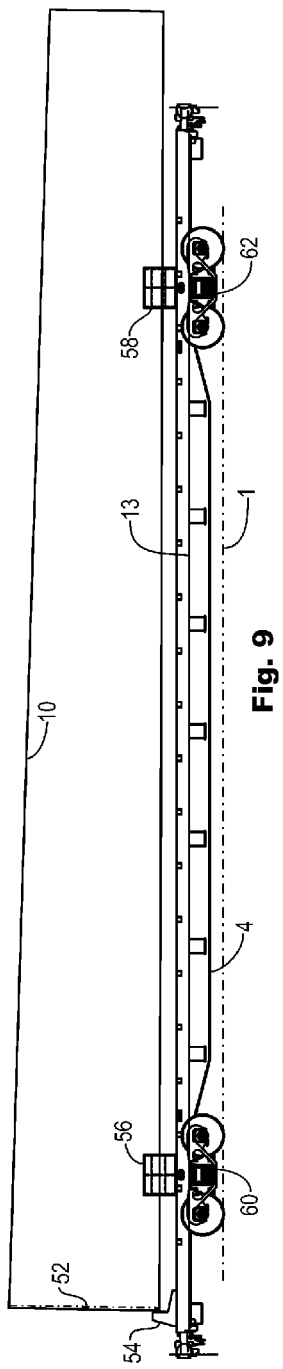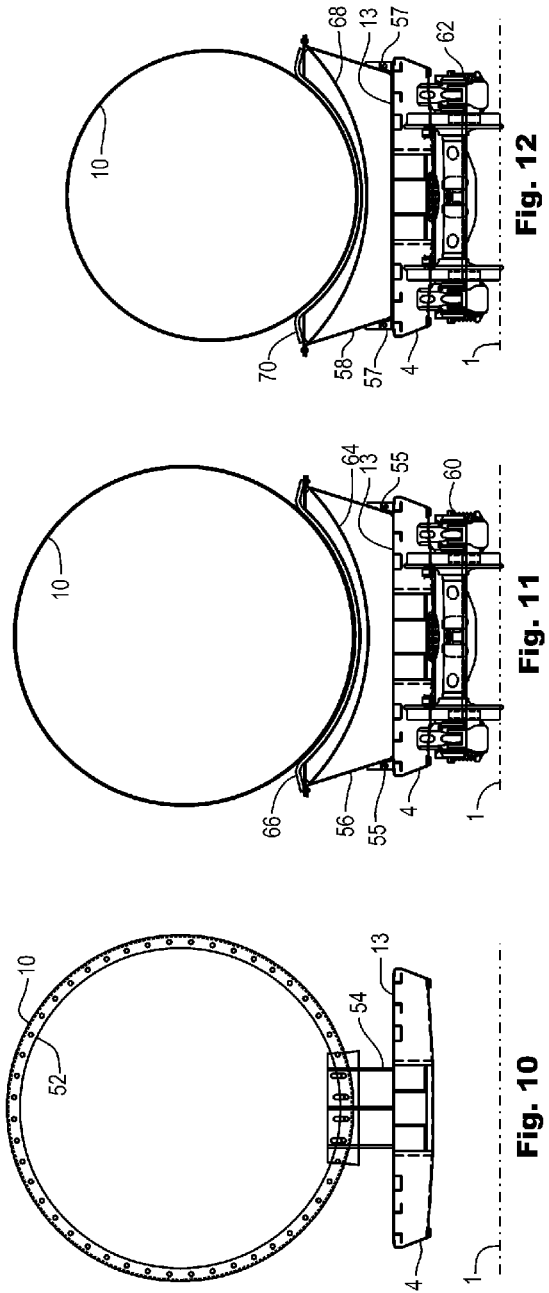

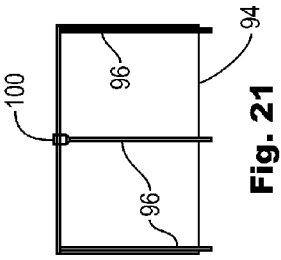
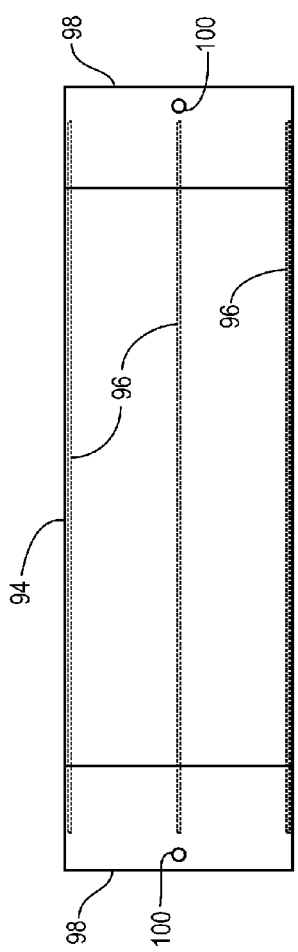
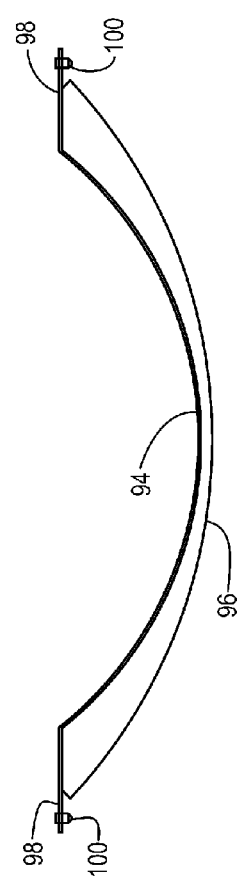
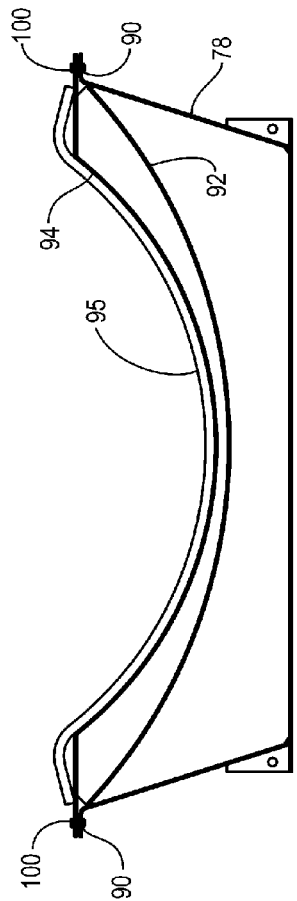

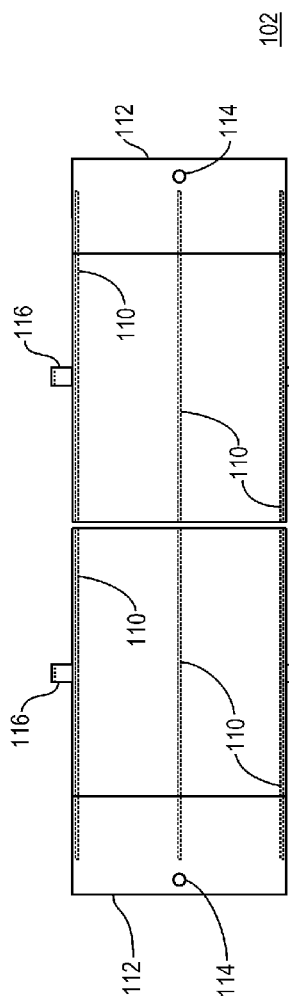
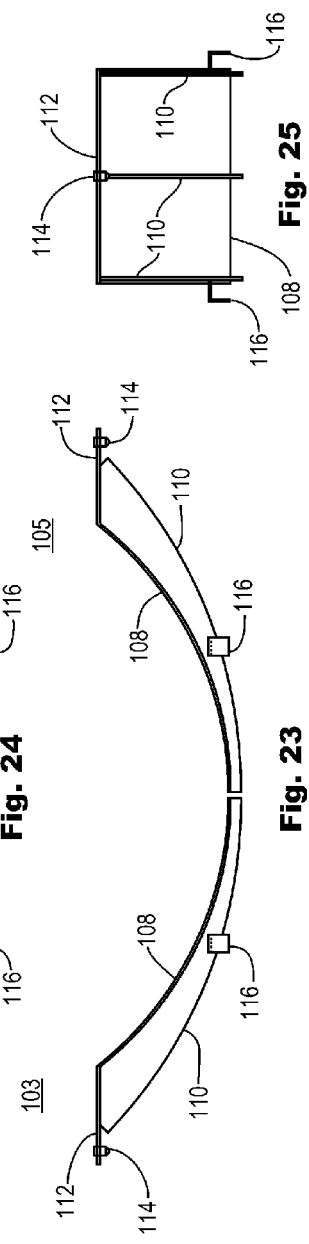
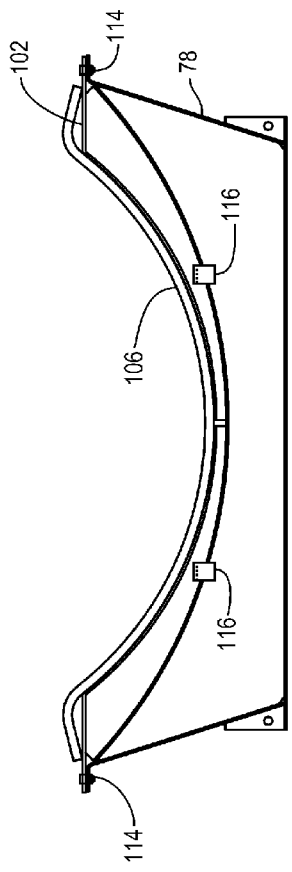

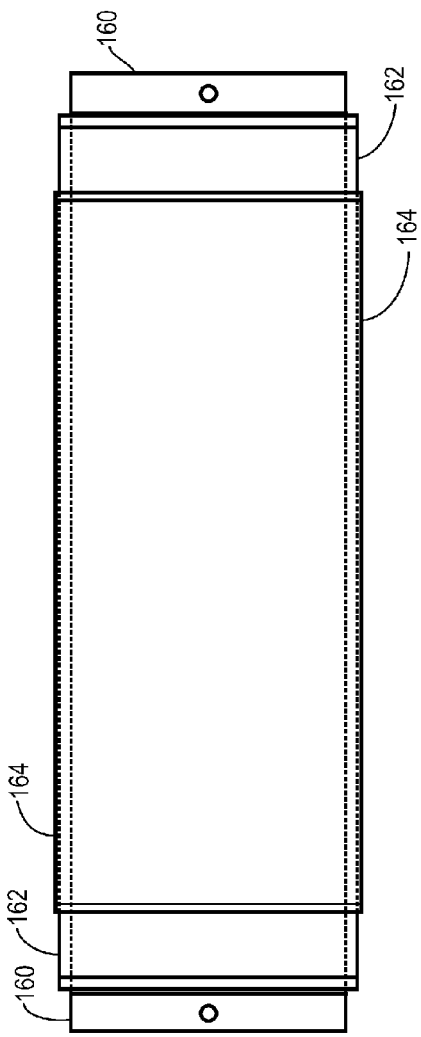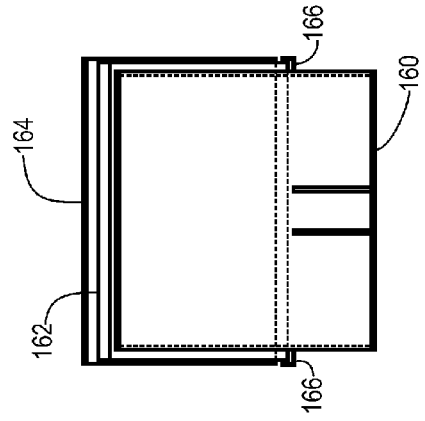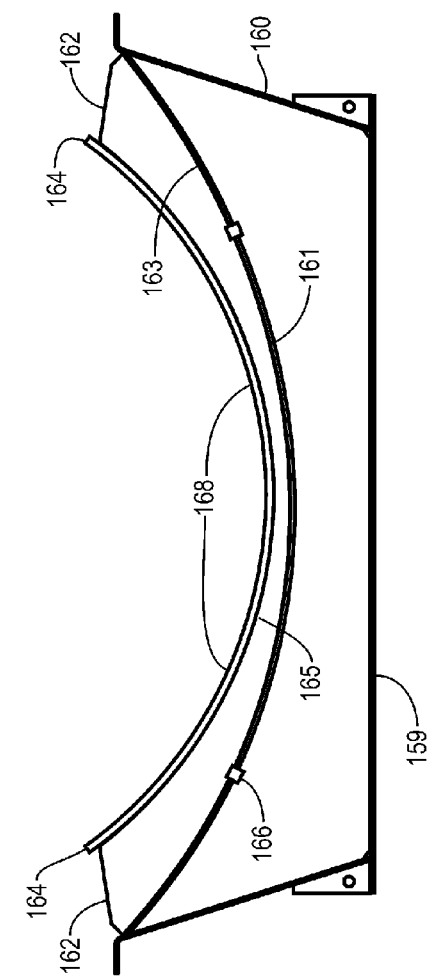

US 8,500,378 B1

LARGE TOWER RAILROAD TRANSPORTATION SYSTEM AND METHOD

BACKGROUND OF THE INVENTION

1. Field of the Invention

The present invention relates to transporting large towers. More specifically, the present invention relates to a system and method for transporting large monopole towers and tower sections, such as towers used to support commercial wind turbines, using one or more railcars.

2. Description of the Related Art

Large-scale wind turbines are used to generate electrical power. Such wind turbines consist of a tall tower with a generator nacelle rotatably coupled about the top of tower's vertical axis. A rotor hub extends out a horizontal axis of the nacelle. Two or more turbine blades are connected to the rotor hub at right angles to the horizontal axis. During operation, prevailing winds cause the turbine blades to rotate about the rotor hub's horizontal axis. The rotational forces are coupled to a generator within the nacelle, which produces electricity. The nacelle rotates about the vertical axis of the tower to maintain the wind turbine blades in proper orientation to the direction of the prevailing winds.

The various components of a large-scale wind turbine may be manufactured at different geographic locations, which may be anywhere in the world. For example, a manufacturer who wishes to assemble a wind turbine generator tower in the United States may have the towers manufactured in Korea, the nacelles manufactured in Denmark and the blades manufactured in Germany. These components must then be transported to the ultimate power generation site, assembled, erected, and placed into operation. Since the manufacturing operations may be spread across the world, transportation of the components to the generation site may utilize all modes of transportation, including ships, barges, trains and trucks. The various components are expensive to manufacture, and include delicate components that must be protected and handled properly during transportation. The transportation issues are exacerbated in that the components may be transported using plural modes during their journey. For example, a wind turbine tower manufactured in Korea may travel by ship across the ocean, then via railroad to a location in the geographic area of the generation site, and then finally by truck to the ultimate destination. Mounting fixtures are needed to adapt the particular component being transported to each mode of transportation.

The evolution of technology and the economies of scale have lead to the development and deployment of large-scale wind turbines with larger and larger proportions. The power generation capacity of a large-scale wind turbine is directly related to the length of the turbine blades, which define the swept area and power capacity of the turbine. The turbine blade proportions, in turn, are determinative of the tower height, as are the prevailing wind conditions. Tower height and wind loading establish the tower's strength requirement. Generally, wind turbine towers will taper from the base to the top, as this provides the requisite strength with the minimum of material and fabrication cost. Transportation and fabrication constraints commonly dictate that tall towers be separated into plural tower sections, which are finally assembled at the generation site. Transportation of long towers and tower section presents significant challenges to transportation engineers, particularly in the case of railroads, where the railroad profile is tightly limited and the trains must traverse curved sections and complex rail yards. Additionally, the requirement to fix towers and tower sections to railcars during transport, particularly given the tapered profile, creates the need for specialized fixtures, and the corresponding expense in their fabrication and utilization. Thus it can be appreciated that there is a need in the art for a system and method addressing the problems related to transportation of long and heavy towers and tower sections via rail.

SUMMARY OF THE INVENTION

The need in the art is addressed by the systems and methods of the present invention. The present invention teaches a system for transporting a tower with a first end, a second end, and an elongated portion, using a railcar with a deck for carrying a load. The system includes a first support means for disposition between the railcar and the tower at a first location, and that is adapted to support the tower above the deck. The system also includes a first saddle assembly with a base for resting upon the deck of the railcar, and a saddle that conforms to the shape of a large tower. The saddle assembly is adapted to support the tower above the deck. The system also includes a spacer assembly, for disposition between the saddle of the first saddle assembly and a second location along the elongated portion of the tower, and that has a saddle rest that conforms to the shaped of the saddle, and that has a spacer saddle that conforms to the shape of the elongated portion of the tower at the second location.

In a specific embodiment, the foregoing system further includes a deck bracket that is fixed to the deck of the railcar, and, the first saddle assembly includes a mount fixed thereto. The mount is removably engaged with the deck bracket, which fixes the first saddle assembly to the deck of the railcar. In a refinement to this embodiment, the mount is a gusset fixed to the first saddle assembly, and the deck bracket and the mount are engaged with a removable pin or bolt.

In a specific embodiment of the foregoing system, the first spacer assembly is located with respect to the first saddle assembly with a corresponding locator pin and locator pin hole. In another specific embodiment, the first spacer assembly further includes a web portion disposed between the saddle rest and the spacer saddle. A bracket is fixed to the web portion and is aligned to engage the sides of the saddle of the first saddle assembly, which retains the first spacer assembly to the first saddle assembly. In another specific embodiment, the spacer assembly is split into two halves.

In a specific embodiment, the foregoing system further includes a resilient saddle liner disposed between the spacer saddle and the second location along the elongated portion of the tower. The resilient saddle liner may have a thickness in the range of 0.25 inches to 2.0 inches. In another specific embodiment, the first support means is a support foot that is fixed to the deck of the railcar and connected to the first end of the tower. In a refinement to this embodiment, the support foot further includes a deck bracket fixed to the deck of the railcar and a load adaptor that is disposed between the deck bracket and the first end of the tower. The load adapter includes plural connections means adapted to connect to plural different tower configurations.

In a specific embodiment of the foregoing system, the first support means is a second saddle assembly that is substantially the same as the first saddle assembly, and, the first location is disposed along the elongated portion of the tower in an area having a larger circumference that at the second location. In another specific embodiment, the system further includes a stop fixed to the deck of the railcar that is engaged to the second end of the tower, so as to resist longitudinal and lateral movement therebetween. In a refinement to this embodiment, the stop further includes a deck bracket fixed to the deck of the railcar and a stop adaptor disposed between the deck bracket and the second end of the tower. The stop adapter includes plural connections means adapted to connect to plural different tower configurations.

In a specific embodiment of the foregoing system, wherein the tower is comprised of plural disassembled tower sections and the assembled tower generally tapers from a first end to a second end, the system further includes plural saddles assemblies that are substantially identical and disposed upon plural railcars. And, the system further includes plural spacer assemblies, each having a spacer saddles, disposed upon the plural saddles assemblies. The size of the plural spacers saddles are graduated to accommodate the tapered profile of the plural tower sections.

In other specific embodiments of the foregoing system, the saddles may be arcuate or polygonal. In another specific embodiment of the foregoing system, the spacer rest and the spacer saddles are shaped to adapt between different tower elongated section profiles, selected from round, elliptical, triangular, square, and polygonal.

In a specific embodiment, wherein the system is for further transporting a second tower section on second railcar having a deck for carrying a load, and wherein the tower and the second tower section are for joining into a unified tower assembly, and wherein the second tower section overhangs a first end of the second railcar, and the second railcar is coupled to the railcar, the system is configured as follows. The first support means is a second saddle assembly that is substantially the same as the first saddle assembly, and the first location is disposed along the elongated portion of the tower in an area having the substantially largest circumference of the unified tower assembly. The system further includes a third saddle assembly and a fourth saddle assembly that are substantially identical to the first saddle assembly, and that are disposed upon the deck of the second railcar for supporting the second tower section there above. The system also includes a second spacer assembly, that is configured substantially the same as the first spacer assembly except that a second spacer saddle conforms to the shape of the elongated portion of the second tower section at a third location, and the second spacer assembly is disposed between the third saddle assembly and the second tower section at the third location. In addition, a third spacer assembly, configured substantially the same as the first spacer assembly except that a third spacer saddle conforms to the shape of the elongated portion of the second tower section at a fourth location, where the third spacer assembly disposed between the fourth saddle assembly and the second tower section at the fourth location. Finally, the second tower section is oriented above the second railcar such that overhang of the second tower section extends over the railcar without interference with the tower disposed thereupon.

The present invention also teaches a method for transporting a tower, which has a first end, a second end, and an elongated portion therebetween, on a railcar that has a deck for carrying a load, by using a first support means, a first saddle assembly with a base and a saddle that conforms to the shape of a large tower, and a spacer assembly with a saddle rest that conforms to the shaped of the saddle and a spacer saddle that conforms to the shape of the elongated portion of the tower. The method includes the steps of disposing the first support means between the railcar deck and the tower at a first location, and resting the base of the first saddle assembly upon the deck of the railcar. Also, engaging the saddle rest of the spacer assembly with the saddle of the first saddle assembly, and aligning the spacer saddle to conformally engage the elongated portion of the tower at a second location, which thereby supports the tower above the railcar deck.

In a specific embodiment of the foregoing method, where the first saddle assembly includes a mount fixed thereto, the method further includes the steps of fixing a deck bracket to the deck of the railcar, and removably engaging the mount of the first saddle assembly with the deck bracket, which thereby fixes the first saddle assembly to the deck of the railcar. In another specific embodiment, the foregoing method further includes the step of locating the first spacer assembly with respect to the first saddle assembly using a corresponding locator pin and locator pin hole.

In a specific embodiment, the foregoing method further includes the step of disposing a resilient saddle liner between the spacer saddle and the second location along the elongated portion of the tower. In another specific embodiment of the foregoing method, where the first support means is a support foot that includes a deck bracket and a load adapter with plural connection means adapted to plural different tower configurations, the method further includes the steps of fixing the deck bracket to the deck of the railcar, and disposing the load adaptor between the deck bracket and the first end of the tower, which thereby supports the tower above the deck of the railcar.

In a specific embodiment of the foregoing method, where the first support means is a second saddle assembly that is substantially the same as the first saddle assembly, the method further includes the step of selecting the first location along the elongated portion of the tower in an area that has a larger circumference than at the second location. In another specific embodiment, the foregoing method further includes the step of fixing a stop to the deck of the railcar and engaging the stop to the second end of the tower, thereby resisting longitudinal and lateral movement therebetween. In a refinement to this embodiment, wherein the stop includes a deck bracket and a stop adaptor with plural connection means adapted for plural different tower configurations, the method further includes the steps of fixing the deck bracket to the deck of the railcar, and disposing the stop adaptor between the deck bracket and the second end of the tower.

In a specific embodiment of the foregoing method, where the tower includes plural disassembled tower sections, and wherein the assembled tower generally tapers from a first end to a second end, the method further includes the steps of disposing plural saddles assemblies that are substantially identical upon plural railcars, disposing plural spacer assemblies, each having a spacer saddle that is graduated to accommodate the tapered profile of the plural tower sections, upon the plural saddles assemblies, and resting the plural tower sections upon the first saddles assembly and the plural spacer saddles.

The present invention teaches a system for transporting a tower with a first end, a second end, and an elongated portion, using a railcar with a deck for carrying a load. The system includes a first support means for disposition between the railcar and the tower at a first location, and that is adapted to support the tower above the deck. The system also includes a first saddle assembly with a base for resting upon the deck of the railcar, and a saddle that conforms to the shape of a large tower. The saddle assembly is adapted to support the tower above the deck. The system also includes a plastic spacer assembly, for disposition between the saddle of the first saddle assembly and a second location along the elongated portion of the tower, and that has a saddle rest that conforms to the shaped of the saddle, and that has a spacer saddle that conforms to the shape of the elongated portion of the tower at the second location.

In a specific embodiment of the foregoing system, the plastic spacer assembly is fabricated from a polymeric resin. In a refinement to this embodiment, the polymeric resin is a foam.

In a specific embodiment of the foregoing system, the plastic spacer assemble comprises plural layers. In a refinement to this embodiment, the plural layers are fabricated from plural different polymeric resins. In a refinement to this embodiment, the plural different polymeric resins have different degrees of compressibility.

In a specific embodiment of the foregoing system, the plastic spacer assembly further comprises a rigid portion and a compressible portion. In a refinement to this embodiment, the rigid portion is comprise of a first cooperative portion and a second cooperative portion engaged to cooperatively define the saddle rest.

In a specific embodiment of the foregoing system, the rigid portion is fabricated from a polymeric foam. In a refinement to this embodiment, the polymeric foam is a closed cell polymeric foam. In a refinement to this embodiment, the polymeric foam is a styrene foam. In a refinement to this embodiment, the compressible portion is fabricated from a polymeric foam. In a refinement to this embodiment, the polymeric foam is an open celled foam.

In a specific embodiment of the foregoing system, the plastic spacer assembly further comprises an impermeable cover. In a refinement to this embodiment, the impermeable cover is formed as a sleeve enclosing at least a portion of the plastic spacer assembly. In a refinement to this embodiment, the at least a portion of the plastic spacer assembly is a compressible portion. In a refinement to this embodiment, the impermeable cover further comprises at least a first tie-down fastener.

BRIEF DESCRIPTION OF THE DRAWINGS

FIG. 1 is a drawing of a train carrying a three-section tower according to an illustrative embodiment of the present invention.

FIG. 2 is a side view drawing of a tower section loaded on a railcar according to an illustrative embodiment of the present invention.

FIG. 3 is a section view drawing of a tower section loaded on a railcar according to an illustrative embodiment of the present invention.

FIG. 4 is a section view drawing of a tower section loaded on a railcar according to an illustrative embodiment of the present invention.

FIG. 5 is a side view drawing of a tower section loaded on a railcar according to an illustrative embodiment of the present invention.

FIG. 6 is a section view drawing of a tower section loaded on a railcar according to an illustrative embodiment of the present invention.

FIG. 7 is a section view drawing of a tower section loaded on a railcar according to an illustrative embodiment of the present invention.

FIG. 8 is a section view drawing of a tower section loaded on a railcar according to an illustrative embodiment of the present invention.

FIG. 9 is a side view drawing of a tower section loaded on a railcar according to an illustrative embodiment of the present invention.

FIG. 10 is a section view drawing of a tower section loaded on a railcar according to an illustrative embodiment of the present invention.

FIG. 11 is a section view drawing of a tower section loaded on a railcar according to an illustrative embodiment of the present invention.

FIG. 12 is a section view drawing of a tower section loaded on a railcar according to an illustrative embodiment of the present invention.

FIG. 18 is an end view drawing of a spacer assembly engaged with a saddle assembly according to an illustrative embodiment of the present invention.

FIG. 19 is an end view drawing of a spacer assembly according to an illustrative embodiment of the present invention.

FIG. 20 is a top view drawing of a spacer assembly according to an illustrative embodiment of the present invention.

FIG. 21 is a side view drawing of a spacer assembly according to an illustrative embodiment of the present invention.

FIG. 22 is an end view drawing of a split spacer assembly engaged with a saddle assembly according to an illustrative embodiment of the present invention.

FIG. 23 is an end view drawing of a split spacer assembly according to an illustrative embodiment of the present invention.

FIG. 24 is a top view drawing of a split spacer assembly according to an illustrative embodiment of the present invention.

FIG. 25 is a side view drawing of a split spacer assembly according to an illustrative embodiment of the present invention.

FIG. 31 is an end view drawing of a plastic spacer assembly engaged with a saddle assembly according to an illustrative embodiment of the present invention.

FIG. 32 is a top view drawing of a plastic spacer assembly engaged with a saddle assembly according to an illustrative embodiment of the present invention.

FIG. 33 is a side view drawing of a plastic spacer assembly engaged with a saddle assembly according to an illustrative embodiment of the present invention.

DESCRIPTION OF THE INVENTION

Figure 17:
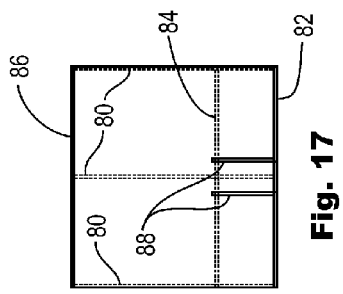
FIG. 17 is a side view drawing of a saddle assembly according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The teachings herein address the problems in the prior art associated with railroad transportation of large towers and tower sections used in conjunction with commercial wind turbine systems. A variety of innovative mounting fixtures are employed, including tower manufacturer supplied fixtures, fixtures permanently attached to railcars, reusable fixtures, and fixture adaptors that accommodate various tower dimensions. The combination of these fixtures enables manufacturers, railroads, and rail services providers to accommodate virtually any tower configuration using the fewest possible number of fixtures types. Additionally, a greater number of the fixture components are reusable than in prior art systems, which substantially reduces costs. Through application of the teachings herein, there is less welding and cutting to and from the railcar decks, which improves utilization of the rolling stock and shortens turn-around time for loads.

Reference is directed to FIG. 1, which is an elevation drawing of a train 2 transporting a three-section tower assembly via rail 1 according to an illustrative embodiment of the present invention. As a preliminary matter, it is to be understood that the term "tower" and "tower section" are largely interchangeable in this disclosure. In the case where a single railcar is carrying a single tower or tower section, there is no distinction between the two. The distinction only exists at the time the tower is erected, which occurs after the tower or tower section has been unloaded from the railcar. In the case where a tower assembly comprises plural tower sections, and where all the tower sections are transported using a single train, then the distinction between a tower and a tower section is worth noting, in that there may be coordinated aspects of the loading and unloading of the tower sections. FIG. 1 illustrates this point.

The train 2 in FIG. 1 comprises three railroad flatcars 4, 6, and 8 traversing railroad 1. The tower assembly comprises three tower sections, which generally taper from the base to the top. Tower section 12 is the base of the tower assembly, which has the largest section diameter. The base tower section 12 is loaded onto the center flatcar 6, and is disposed toward one end of the flatcar 6, clearing an open area at the opposite end of the flatcar 6. The middle tower section 14 is loaded onto flatcar 8, and has a length that consumes substantially the entire length of flatcar 8. The top tower section 10 is loaded onto flatcar 4. Note that the length of the top tower section 10 is longer than the length of the flatcar 4. The top tower section 10 is therefore disposed upon the flatcar 4 such that one end of the top tower section 10 extends over the next coupled flatcar 6. This explains the need to dispose the base tower section 12 toward one end of its flatcar 6, as this space provides clearance from the overhang of the top tower section 4. Those skilled in the art will appreciate that flatcars 4 and 6 serve as convention "load" cars, and that flatcar 6 serves as both a load car and an "idler" car, in that flatcar 6 provides clearance for the unsupported load of flatcar 4. Other tower assembles with other numbers of tower sections, and lengths can readily be accommodated by the teachings of the present invention, and FIG. 1 serves as just one illustrative embodiment.

Reference is directed to FIG. 2, which is a side view drawing of a tower section 12 loaded on a railcar 6 according to an illustrative embodiment of the present invention. FIG. 2 illustrates the aforementioned base tower section 12 on the center flatcar 6 of the train in FIG. 1. The railcar 6 is a standard 90-foot flatcar with two conventional bolsters 18, 20. The base tower section 12 is provided from the manufacturer with one fixed mounting foot 24, which is retained to the deck 7 of the flatcar 6 with welded retainers (not shown) as are know to those skilled in the art. The opposite end of the base tower section 12 is supported with a non-manufacturer provided mounting foot 22. Foot 22 may be provided by a rail services company. In this illustrative embodiment, the mounting foot 22 is welded to the deck 7 of the flatcar 6, and retains the tower section 12 against movement in all three axes. Note that foot 22 is positioned over bolster 18 and foot 24 is position between bolster 20 and the end coupler 9. Consideration is to be given to the weight of tower section 12 and the concentrated loads applied to the deck 7 of the railcar 6, as is understood by those skilled in the art.

Reference is directed to FIG. 3, which is a section view drawing of tower section 12 loaded on flatcar 6 at bolster 18 according to an illustrative embodiment of the present invention. The section view is taken at the position of the mounting foot 22 and bolster 18. The end of the tower section 12 includes an external flange 26 with a plurality of bolt holes therethrough. The mounting foot 22 includes a plate with slotted holes, which align with the bolt holes in flange 26. Plural bolts (not shown) are used to connect the mounting foot 22 to the flange 26, thereby supporting the tower section 12 above the deck 7 of the flatcar 6. The mounting foot 22 also include plural gussets that are welded to the deck 7 of the flatcar 6.

Reference is directed to FIG. 4, which is a section view drawing of tower section 12 loaded on flatcar 6 at mounting foot 24 according to an illustrative embodiment of the present invention. The manufacturer provided mounting foot 24 has been previously connected to an internal flange 28 of the tower section 12. The foot 24 is connected to the deck 7 of the flatcar 6. The techniques for connection are known to those skilled in the art.

Reference is directed to FIG. 5, which is a side view drawing of the middle tower section 14 loaded on flatcar 8, previously referenced in FIG. 1, according to an illustrative embodiment of the present invention. Flatcar 8 is a conventional 90-foot flatcar with a pair of conventional bolsters 48, 50, and a load deck 11. In this embodiment, the tower section 14 has a length approximately as long as the flatcar 8 deck 11, and therefore does not overhang the deck 11, nor does it provide any clearance for adjacent load overhang. The middle tower section 14 includes an internal flange 30 on its larger circumference end, which engages the base tower section when the tower is finally assembled. The flange 30 is also used as an attachment point for the stop 34 disposed between the deck 11 of the flatcar 8 and the tower section 14 during transit. The stop 34 retains the tower section 14 against longitudinal movement with respect to the flatcar 8. To a lesser extend, the stop 34 also retains the tower section 14 against lateral movement, and the primary lateral support is by saddles assemblies 38, 42. The weight of the tower section 14 is supported by a first saddle assembly 38 located over bolster 48, and a second saddle assembly 42 located over bolster 50. The second saddle assembly 42 also includes a spacer assembly, discussed further hereinafter. It is preferable to locate the saddles assembles 38, 42 over the bolster 48, 50 because the weight of the tower is transferred more directly to the underlying rails 1. This arrangement mitigates any issues with respect to concentrated loads placed upon the flatcar 8, provided that the total loading does not exceed railroad and railcar design limits, as are known to those skilled in the art.

Reference is directed to FIG. 6, which is a section view drawing of tower section 14 loaded on railcar 8, as described with respect to FIG. 5, and according to an illustrative embodiment of the present invention. The section view is taken at the location of the flange 30 end of tower section 14. The internal flange 30 of the tower section 14 is visible. After the tower section 14 is loaded onto the flatcar 8, plural connecting bolts join the flange 30 to the stop 34, which has previously been fixed to the deck 11, such as by welding or other suitable means. As illustrated, the stop 34 is comprised of an attachment plate bolted to the flange 30, and of plural gusset plates welded to the attachment plate and the deck 11 of the flatcar 8. Those skilled in the art will appreciate that other stop designs could be envisioned that provide the requisite retention of the tower section 14 against longitudinal and lateral movement.

Reference is directed to FIG. 7, which is a section view drawing of tower section 14 loaded on railcar 8 according to an illustrative embodiment of the present invention. The section view is taken at the position of bolster 48 of the flatcar 8, which is also the location of saddle assembly 38. The saddle assembly 38 is fixed to the deck 11 of the flatcar 14. There are various means for fixing the saddle assembly and deck together, which will be more fully discussed hereinafter. The upper surface of the saddle assembly 38 is a saddle that conforms to the shape of the tower section 14 at a location along the elongated portion of the tower section at which the saddles assembly engages. Since the tower 14 in this illustrative embodiment is circular in cross section, the saddle 38 is an arcuate circular section, conforming to the exterior shape of the tower section 14. In this illustrative embodiment, the engagement point is adjacent to the largest end of the tower section 14. Since the tower assembly generally tapers, saddle assembly 38 has the largest arcuate diameter required to support this tower assembly. Note that a resilient saddle liner 40 is disposed between saddle assembly 38 and the surface of the tower section 14. The liner 40 serves to protect the surface finish of the tower section 14 and to accommodate small variances between the to two surface shapes. The resilient liner can be fabricated from any suitable material known to those skilled in the art, such as rubber, synthetic rubber, polymeric foams, or other synthetic materials possessing the requisite resilient characteristics.

Reference is directed to FIG. 8, which is a section view drawing of tower section 14 loaded on railcar 8 according to an illustrative embodiment of the present invention. This section view is taken at the location of bolster 50, which is also the location of saddle assembly 42. Saddle assembly 42 is substantially the same as saddle assembly 38 of FIG. 5. The advantage of making the saddle assemblies the same is lower production costs, reduced inventory overhead, and greater utilization of assets. The need to accommodate different sizes and shapes of tower cross sections are addressed by employing particular spacer assemblies. In FIG. 8, spacer assembly 44 is positioned on top of saddle assembly 42, and adapts the conformal shape of the saddle assembly 42 to the exterior shape of the tower section 14 at the location of support of saddle assembly 42. Since the tower section 14 has a smaller diameter at the location of saddle assembly 42, the spacer assembly 44 presents a correspondingly smaller diameter spacer saddle profile. Note that a resilient liner 46 is disposed between the spacer assembly saddle 44 and the tower 14. Also note that the saddle assembly 42 is fixed to the deck 11 of the flatcar 8 using pins disposed between fixed deck brackets and gussets on the saddle assembly (see reference numeral 45 generally, which will be more fully detailed hereinafter).

Reference is directed to FIG. 9, which is a side view drawing of the upper tower section 10 loaded on flatcar 4, as previously referenced in FIG. 1, and according to an illustrative embodiment of the present invention. Flatcar 4 is a conventional 90-foot flatcar with a pair of conventional bolsters 60, 62, and a load deck 13. In this embodiment, the tower section 10 has a length this is substantially longer than the deck 13 of the flatcar 4. The tower section 10 is arranged to overhang one end of the flatcar 4, and thusly requires clearance on an adjacent flatcar (not shown) in the train. As was discussed with respect to the flatcar 6 and tower section 12 hereinbefore, the requisite clearance is provided by shifting the position of tower section 12 on the adjacent flatcar. The upper tower section 10 includes an internal flange 52 on its larger circumference end, which engages the middle tower section when the tower is finally assembled. The flange 52 is also used as an attachment point for the stop 54 disposed between the deck 13 of the flatcar 8 and the tower section 14 during transit. The stop 54 retains the tower section 10 against longitudinal movement with respect to the flatcar 4. To a lesser extend, the stop 54 also retains the tower section 10 against lateral movement. The weight of the tower section 10 is supported by first saddle assembly 56 located over bolster 60, and a second saddle assembly 58 located over bolster 62. Both saddle assemblies 56, 58 also include corresponding spacer assemblies, discussed further hereinafter. Since all of the saddle assemblies for this tower section 10, and the tower section 14 are substantially the same, and since the tower sections gradually taper, the spacers accommodate the gradual reduction on the tower circumference, thereby maintaining a proper conformal fit to the tower sections at every support location.

Reference is directed to FIG. 10, which is a section view drawing of tower section 10 loaded on railcar 4, as described with respect to FIG. 9, according to an illustrative embodiment of the present invention. The section view is taken at the location of the flange 52 end of tower section 10. The internal flange 52 of the tower section 10 is visible. After the tower section 10 is loaded onto the flatcar 4, plural connecting bolts join the flange 52 to the stop 54, which has previously been fixed to the deck 13, such as by welding or other suitable means. As illustrated, the stop 54 is comprised of an attachment plate bolted to the flange 52, and of plural gusset plates welded to the attachment plate and the deck 13 of the flatcar 4. Those skilled in the art will appreciate that other stop designs could be envisioned that provide the requisite retention of the tower section 10 against longitudinal and lateral movement.

Reference is directed to FIG. 11, which is a section view drawing of tower section 10 loaded on railcar 4 according to an illustrative embodiment of the present invention. The section view is taken at the position of bolster 60 of the flatcar 4, which is also the location of saddle assembly 56. The saddle assembly 56 is fixed to the deck 13 of the flatcar 4. There are various means for fixing the saddle assembly and deck together as will be appreciated by those skilled in the art. In this illustrative embodiment, a combination of fixed deck brackets, gussets on the saddle assembly, and pins or bolts (see reference numeral 55 generally) are employed to removably fix the saddle assembly 56 to the deck 13. The upper surface of the saddle assembly 56 is a saddle that conforms to the largest shape of tower section 14, discussed hereinbefore. The smaller circumference of tower section 10, at the location at which saddle assembly 56 provides support, is accommodated with spacer assembly 64. Spacer assembly 64 adapts from the larger arcuate diameter of the saddle of saddle assembly 56 to the actual arcuate diameter of the exterior of tower section 10 at the point of support. Also, a resilient saddle liner 66 is disposed between saddles assembly 64 and the surface of the tower section 10.

Reference is directed to FIG. 12, which is a section view drawing of tower section 10 loaded on railcar 4 according to an illustrative embodiment of the present invention. The section view is taken at the position of bolster 62 of the flatcar 4, which is also the location of saddle assembly 58. The saddle assembly 58 is fixed to the deck 13 of the flatcar 4. In this illustrative embodiment, a combination of fixed deck brackets, gussets on the saddle assembly, and pins or bolts (see reference numeral 57 generally) are employed to removably fix the saddle assembly 58 to the deck 13. The upper surface of the saddle assembly 58 is a saddle that conforms to the largest shape of tower section 14, discussed hereinbefore. The smaller circumference of tower section 10, at the location at which saddle assembly 58 provides support, is the smallest diameter supported in this embodiment, and is accommodated with spacer assembly 68. Spacer assembly 68 adapts from the larger arcuate diameter of the saddle of saddle assembly 58 to the actual arcuate diameter of the exterior of tower section 10 at the point of support. Also, a resilient saddle liner 70 is disposed between saddles assembly 64 and the surface of the tower section 10.

Figure 14:
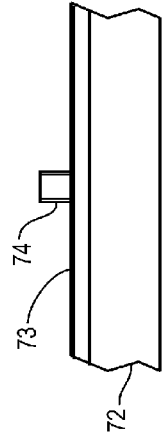
FIG. 14 is a partial side view drawing of a railroad flatcar.
Figure 13:
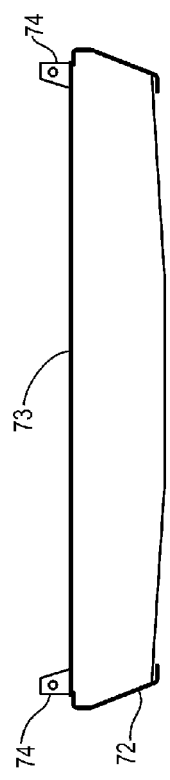
FIG. 13 is a section view drawing of a railroad flatcar.

Reference is directed to FIG. 13 and FIG. 14, which are an end section view and a side section view drawing, respectively, of a railroad flatcar 72 with a pair of attachment brackets 74 attached thereto, and according to an illustrative embodiment of the present invention. The brackets 74 are configured using steel plate bent to form a box-like shape with one surface angled to match the angle of the saddle assembly side plate. A hole is formed through the bracket 74 to accept a pin or bolt, which also engages a corresponding hole on a gusset of the saddles assembly, which is more fully described hereinafter. The brackets 74 are welded to the deck 73 of the flatcar 72. There is one bracket 74 on each side of the deck 73 of the flatcar 72, each engaging an opposite side of the saddle assembly.

Figure 16:
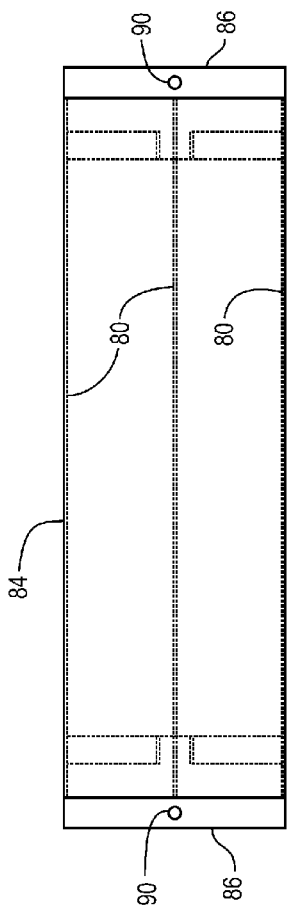
FIG. 16 is a top view drawing of a saddle assembly according to an illustrative embodiment of the present invention.
Figure 15:
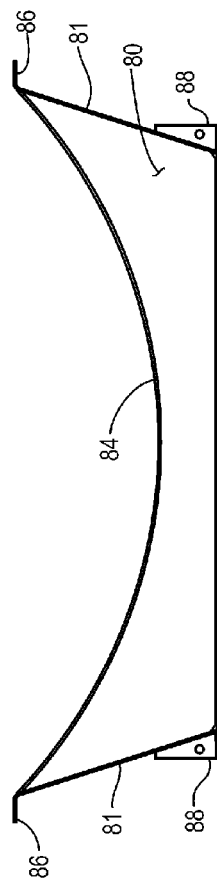
FIG. 15 is an end view drawing of a saddle assembly according to an illustrative embodiment of the present invention.

Reference is directed to FIG. 15, FIG. 16, and FIG. 17, which are an end view, top view, and side view drawing, respectively, of a saddle assembly 78 according to an illustrative embodiment of the present invention. This saddle assembly is fabricated from mild steel and is designed to accommodate the largest diameter tower section contemplated for the system. Since diameter is particularly associated with a circular cross section member, it is more appropriate to reference the saddle assembly 78 size as accommodating the largest 'circumference' of a tower section contemplated in the systems. This term more fully encompasses other tower cross-sections, which may be ellipses, ovals, triangles, squares, polygons or any other arbitrary shape. The base 82 of the saddle assembly 78 is a flat plate for engaging the flat deck of a railcar, such as a flatcar. A pair of side plates 81 extend upwardly and outwardly from the base 82 and each terminate with bend to a flange 86, which has a locator pin hole 90 formed therethrough. Three web plates 80 are disposed between the side plates 81 and the base plate 82. The upper surface of the web plates 80 are cut to match the profile of the tower section, which in this embodiment is a circular profile. A saddle plate 84 is fixed to the top of the web plates 80 and to the side plates 81 at the bend to the flanges 86. A pair of gusset plates 88 are fixed to either side of the assembly, which a corresponding cut-out in the base plate 82 to engage the deck brackets 74 discussed with respect to FIG. 13. In FIG. 15, the gusset plates 88 have holes formed therethrough to accommodate pins or bolts, which fix the saddles assembly 78 to the railcar 72 via the aforementioned deck brackets 74.

Reference is directed to FIG. 18 which is an end view drawing of a spacer assembly 92 engaged with the saddle assembly 78 described with regards to FIG. 15, and according to an illustrative embodiment of the present invention. The saddle of the saddle assembly 78 provides the support surface for the spacer assembly 92. A pair of pins 100 fixed to the spacer assembly 92 at its flanges, engages the pin holes 90 in the flanges of the saddles assembly 78, thereby locating the spacer assembly 92 with respect to the saddles assembly 78. The saddle of the spacer assembly 94 will be hereinafter referred to as the 'spacer saddle' to clearly differential it from the saddle of the saddle assembly. The lower portion of the spacer saddle 96 that engages the saddle of the saddle assembly 78 will be referred to as the 'saddle rest'. A resilient liner 95 may be disposed on the top of the spacer saddle 94 to protect the finish of the tower section (not shown) and to accommodate slight variations between the shape of the spacer saddle 94 and the shape of the tower section exterior (not shown).

Reference is directed to FIG. 19, FIG. 20, and FIG. 21, which are an end view, top view, and side view drawing, respectively, of the spacer assembly 92 discussed in regards to FIG. 18, and according to an illustrative embodiment of the present invention. The spacer assembly 92 includes a spacer saddle plate 94, which is formed to conform to the supported portion of the tower section profile, and which is terminated with a pair of bends to flanges 98 for engaging and underlying saddles assembly 78. The flanges 92 each have a locator pin 100 fixed thereto, and aligned to engage the aforementioned pin holes 90 in the saddle assembly 78. Three web plates 96 are cut to adapt between the spacer saddle plate 94 and the saddles of the saddle assembly (not shown). There is no bottom plate required from the spacer assembly 92, since there is adequate strength when the two assemblies are joined.

The lower portion of the web plates 96 are referred to as the saddle rest, since they engage the underlying saddle and rest thereupon.

Reference is directed to FIG. 22 which is an end view drawing of a split spacer assembly 102 engaged with the saddle assembly 78 described with regards to FIG. 15, and according to an illustrative embodiment of the present invention. The saddle of the saddle assembly 78 provides the support surface for two halves of the split spacer assembly 102. The split spacer assembly 102 is comprised of two substantially identical halves, which together form a single function spacer assembly. The benefit of this arrangement is that each half is more compact, easier to handle, and lighter in weight, as well as stronger than a single full spacer assembly. The split spacer assembly is together have a pair of pins 114, one each fixed to each half of the split spacer assembly 102 at their flanges 112, which engage the aforementioned pin holes in the flanges of the saddles assembly 78, thereby locating the split spacer assembly 92 with respect to the saddles assembly 78. However, since the split spacer assembly 102 is divided in the center of its web section, the location with respect to the saddle assembly is not as secure. To address this issue, a pair of locator clips 116 are fixed to the either side of the webs of both halves of the split spacer assembly 102. The clips 116 may be short sections of angle iron that are fixedly positioned to engage the sides of the saddles assembly 118, thereby preventing movement and retaining the split spacer 102 halves on the saddles assembly 78. A resilient liner 106 may be disposed on the top of the spacer saddle 94 to protect the finish of the tower section (not shown) and to accommodate slight variations between the shape of the spacer saddle 94 and the shape of the tower section exterior (not shown).

Reference is directed to FIG. 23, FIG. 24, and FIG. 25, which are an end view, top view, and side view drawing, respectively, of the split spacer assembly 102 discussed in regards to FIG. 22, and according to an illustrative embodiment of the present invention. The split spacer assembly 102 includes the two halve 103 and 105, which are essentially identical. Each half 103, 105 includes a spacer saddle plate 108, which is formed to conform with the requisite tower section profile, and which is terminated with a bend to a flange 112 for engaging the underlying saddles assembly. The flanges 112 each have a locator pin 114 fixed thereto, and aligned to engage the aforementioned pin holes in the saddle assembly 78. Each half includes three web plates 110 that are cut to adapt between the spacer saddle plate 108 and the saddle of the saddle assembly (not shown). There is no bottom plate required for the split spacer assembly halves 103, 105, since there is adequate strength when the three assemblies are joined. Each split saddle halve 103, 105 includes a pair of locator clips 116 that car short lengths of angle iron or bent plate, and which are welded to the web plates 110, and aligned as described hereinbefore.

Figure 26:
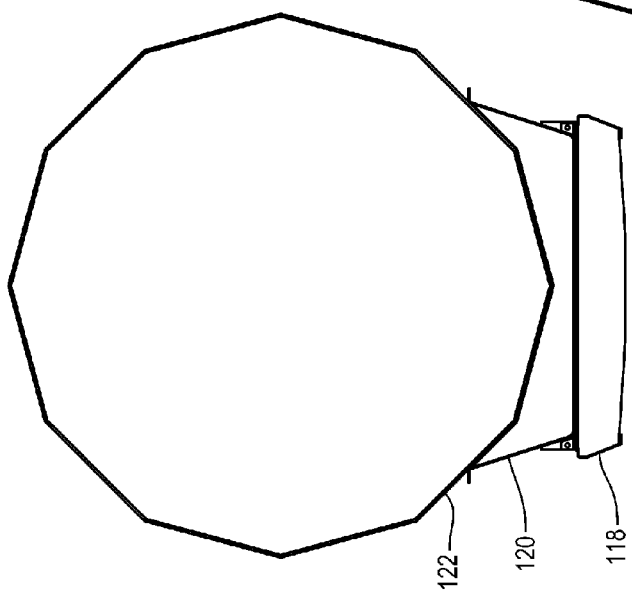
FIG. 26 is a section view drawing of a tower loaded on a flatcar according to an illustrative embodiment of the present invention.

Reference is directed to FIG. 26, which is a section view drawing of a tower 122 loaded on a flatcar 118 according to an illustrative embodiment of the present invention. This illustrative embodiment presents an application of the present invention for use with a polygonal tower profile 122. The saddle assembly 120 includes a saddle that conforms to the shape of the tower, but is otherwise the same design, which has been described hereinbefore.

Figure 27:
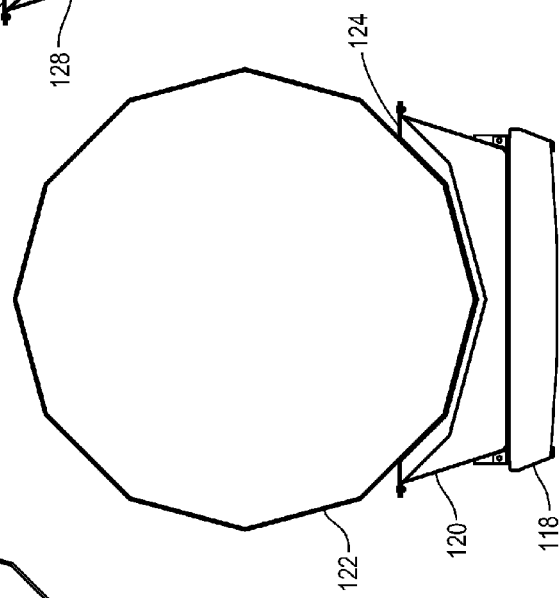
FIG. 27 is a section view drawing of a tower loaded on a flatcar according to an illustrative embodiment of the present invention.

Reference is directed to FIG. 27, which is a section view drawing of a smaller circumference portion of tower 122 loaded on the flatcar 118 discussed in regards to FIG. 26, and according to an illustrative embodiment of the present invention. This embodiment presents a spacer assembly 124 that is adapted to a polygonal tower profile 122. The lower portion of the spacer assembly 124 has a saddles rest that conforms to the polygonal saddle profile of the saddle assembly 120, and a spacer saddle that conforms to the supported portion of the polygonal tower.

Figure 28:
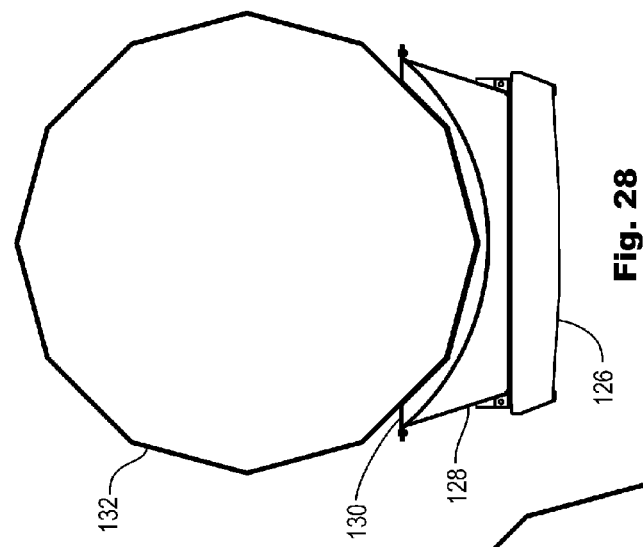
FIG. 28 is a section view drawing of a tower loaded on a flatcar according to an illustrative embodiment of the present invention.

Reference is directed to FIG. 28, which is a section view drawing of a tower 132 loaded on a flatcar 126 according to an illustrative embodiment of the present invention. This embodiment presents an application where the spacer assembly 130 adapts between two different profiles. The saddles assembly 128 includes a circular profile, as has been discussed hereinbefore. The saddle spacer 130 includes a lower saddle rest that conforms to the circular saddle, and a spacer saddles that conforms to the polygonal tower profile illustrated. These examples demonstrated that flexibility of the present inventive systems and methods.

Figure 29:
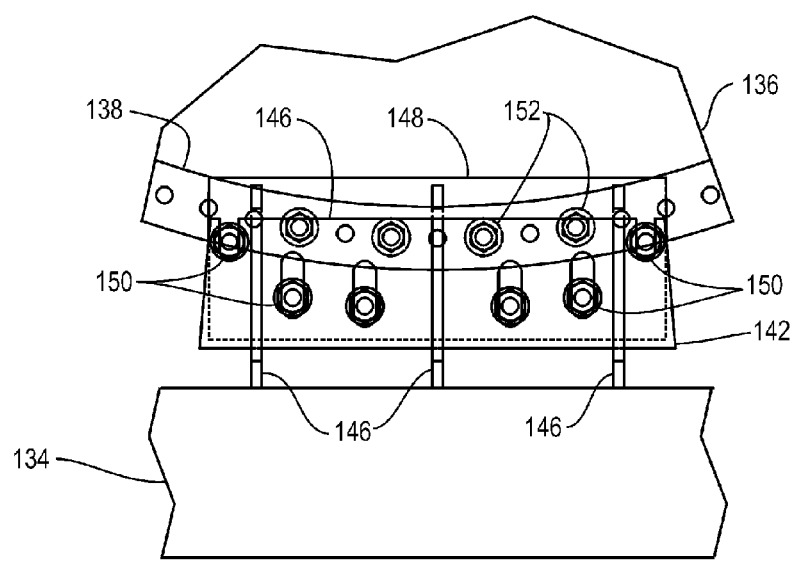
FIG. 29 is an end view drawing of an adaptable tower stop or foot according to an illustrative embodiment of the present invention.
Figure 30:
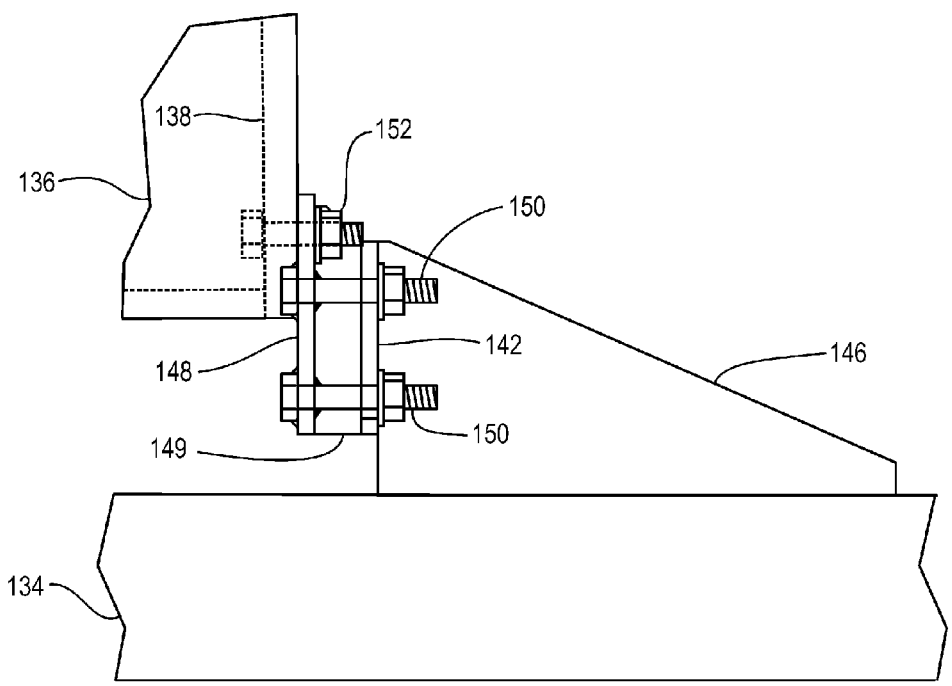
FIG. 30 is a side view drawing of an adaptable tower stop or foot according to an illustrative embodiment of the present invention.

Reference is directed to FIG. 29 and FIG. 30, which are an end view drawing and a side view drawing, respectively, of an adaptable stop or adaptable foot according to an illustrative embodiment of the present invention. The adaptable stop or foot is disposed between the railcar 134 and a tower section 136. The advantage of the adaptable stop or foot is that a deck bracket can be permanently fixed to the deck of the railcar 134, and with a suitable stop adaptor or load adaptor selected to accommodate the physical arrangement of the specific tower section being transported. The difference between a stop and a foot is that a foot is designed to carry the weight of the tower section, whereas a foot is designed to primarily resist lateral and longitudinal movement of the tower section with respect to the deck of the railcar. For the remainder of this discussion, the word 'stop' will be used, while it is understood that the structure is also applicable to a foot. The deck bracket consists of plural gusset plates 146 that are welded to the deck of the railcar 134. A mounting plate 142 is welded to the gussets 146, and has plural bolt holes for accommodating plural bolts 150. The plural bolts 150 are used to attach a stop adaptor (or load adaptor). The stop adaptor consists of an adaptor plate 148 and plural spacing ribs 149. The adaptor plate has additional bolt holes to accommodate plural mounting bolts 152, which are located and spaced to suit the particular tower section 136 that is to be transported. The tower section 136 includes a flange 138 with a bolt circle, through which the plural mounting bolts 152 are connected. In this manner, a single mounting bracket can remain fixed to the railcar, while plural stop adaptors can be utilized to adapt to plural different tower section configurations.

Reference is directed to FIGS. 31, 32, and 33, which are end view, top view and side view drawings, respectively, of a saddle and spacer assembly according to an illustrative embodiment of the present invention. A saddle assembly 160 is essentially the same as hereinbefore described saddle assemblies. In particular, saddle assembly 160 comprises a base 159 for resting on the deck of a railcar (not shown), and a saddle 163, which is shaped to accommodate the outside circumference of the largest tower section intended for carry by that saddle. A plastic spacer assembly is comprised of two portions, a rigid polymeric foam portion 162 and a compressible polymeric foam portion 165. The rigid portion 162 is formed with a saddle rest surface 163 that conforms to the shape of the saddle 161 of the saddle assembly 160. The upper surface 165 of the rigid portion is formed to accommodate the outer circumference of the intended tower section by a margin that is slightly smaller in circumference than required in order to provide space for the compressed thickness of a compressible portion 164. In an illustrative embodiment, the rigid portion is formed from expanded polystyrene, commonly referred to as Styrofoam. In one embodiment, the material is a rigid cellular expanded polystyrene with a density of 2.85 pounds per cubic foot and a compressive resistance for 10% compression of 50.0 pounds per square inch. Such material is available from AFM Corporation through its Internet website www.geofoam.com. This material is rigid, impervious to moisture, lightweight, cost effective, and sufficiently durable for repeated use. In the illustrative embodiment, the compressible portion 164 is an open celled polymeric foam, which is selected with a density that provides proximately ten to fifteen percent compression when the tower load is applied. For example, a 2.25" thick polyurethane foam that compresses to 2.0". Thus, the saddle rest surface 165 is sized to be two inches in radius larger than the outside surface of the intended tower section. This yields a loaded spacer saddles surface 168 that conforms very closely to the exterior of the tower section (not shown). In the illustrative embodiment plural retaining clips 166 are positioned to control movement of the plastic spacer assembly, particularly along the longitudinal axis of the tower section and railcar.

The plastic spacer assembly, as compared to the previous described steel spacer assembly, yields a number of benefits. While it is less durable over repeated uses, it is lower in cost and lighter in weight. The compressible portion enables the spacer assembly to fully conform to the exterior of the tower section, which provides more even distribution of the load and reduces the likelihood of damage to the finish during transportation. Handling of the spacer assembly by crews at the loading and unloading sites is much easier due to the weight reduction. Also, there is a greater degree of flexibility in material selection to accommodate durability, environmental considerations, life expectancy, costs, and load ranges. Various synthetic polymeric resins or polymer materials can be employed with various structural arrangements, including open cell foam, closed cell foam, extrusions, castings, and matrix structures. Varying degrees of compressibility can be employed to accommodate various loads and transport requirements.

Figure 34:
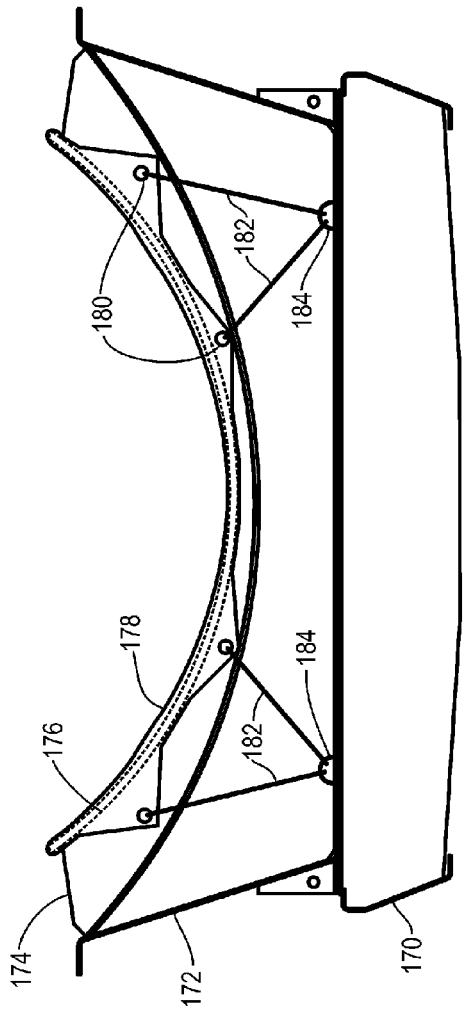
FIG. 34 is an end view drawing of a plastic spacer assembly engaged with a saddle assembly according to an illustrative embodiment of the present invention.

Reference is directed to FIG. 34, which is an end view drawing of a saddle and spacer assembly according to an illustrative embodiment of the present invention. In this embodiment the railcar 170 is presented with a steel saddle assembly 172 in places, as has be discussed hereinbefore. Plural D-rings 184 are affixed to the deck of the railcar 170. The plastic spacer saddle is comprised of a rigid portion 174 and a compressible portion 176, in a similar fashion to those described with regard to FIGS. 31, 32, and 33. However, it is realized that since open cell foam may be used from the compressible portion 176, there is a likelihood that water will be absorbed. Also, there may be an adverse reaction with the finish on the tower surface (not shown). In order to mitigate these issues, an impermeable cover 178 is applied on top of the compressible portion 176. Various materials are suitable for use as an impermeable cover, including polypropylene tarpaulin, vinyl coated fabric, and other impermeable materials and fabrics as are known to those skilled in the art. In one embodiment, the impermeable cover is formed as a sleeve, similar to a sleeping bag, into which that compressible portion 176 is inserted. This is beneficial in that the entire compressible portion is protected from the elements and intrusion of moisture. Further, in FIG. 34, the impermeable cover 178 may be formed with plural tie-down fasteners 180, such as eyelets or other connectors. This enables the use of ties 182 that are fixed between the tie-down fasteners 180 and the D-rings 184 on the deck of the railcar 170. Suitable ties 182 are rope, cord, chain, and elastic bungee cords. The benefit of the tie-down process is to retain the plastic saddles spacer in place during loading and transport.

Figure 35:
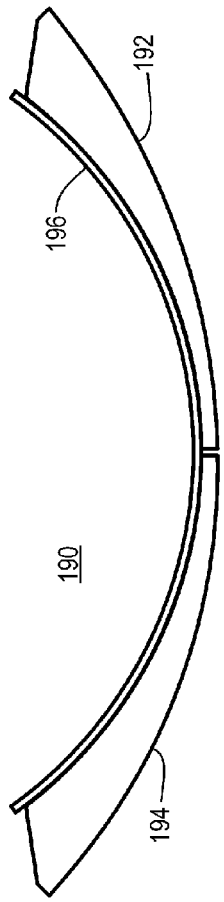
FIG. 35 is an end view drawing of a plastic spacer assembly according to an illustrative embodiment of the present invention.

Reference is directed to FIG. 35, which is an end view drawing of a plastic spacer assembly according to an illustrative embodiment of the present invention. This plastic spacer assembly 190 is comprised of a compressible portion 196 and a pair of cooperative rigid portions 192, 194. Since the rigid portion is thinnest near the center, this is the structurally weakest area, and may be prone to breakage. In addition the proportions of the rigid portion are elongated, sometimes requiring extra care in handling. By fabricated two rigid portions 194, 192, these issues are mitigated. The tow portions 192, 194 may be identical where the separation is made at the center of the structure.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for transporting a tower sections having various circumferences, including a first tower section having a smaller circumference than a second tower section having a larger circumference, wherein each tower section has a first end, a second end, and an elongated portion therebetween, on a railcar having a deck for carrying a load, the system comprising:
   a first support means for disposition between the railcar and the first tower section at a first location, and adapted to support the first tower section above the deck;
   a first saddle assembly having a base configured to rest upon the deck of the railcar at a second location along the elongated portion of the first tower section, and a saddle that conforms to the shape of the larger circumference of the second tower section, and
   a plastic spacer assembly, for disposition between said saddle of said first saddle assembly at a second location along the elongated portion of the first tower section, and having a saddle rest that conforms to the shaped of said saddle, and a spacer saddle that conforms to the shape of the smaller circumference of the first tower section at said second location.

2. The system of claim 1, and wherein said plastic spacer assembly is fabricated from a polymeric resin.

3. The system of claim 2, and wherein said polymeric resin is a foam.

4. The system of claim 1, and wherein said plastic spacer assemble comprises plural layers.

5. The system of claim 4, and wherein said plural layers are fabricated from plural different polymeric resins.

6. The system of claim 5, and wherein said plural different polymeric resins have different degrees of compressibility.

7. The system of claim 1, and wherein said plastic spacer assembly further comprises a rigid portion and a compressible portion.

8. The system of claim 7, and wherein said rigid portion is comprise of a first cooperative portion and a second cooperative portion engaged to cooperatively define said saddle rest.

9. The system of claim 1, and wherein said rigid portion is fabricated from a polymeric foam.

10. The system of claim 9, and wherein said polymeric foam is a closed cell polymeric foam.

11. The system of claim 9, and wherein said polymeric foam is a styrene foam.

12. The system of claim 7, and wherein said compressible portion is fabricated from a polymeric foam.

13. The system of claim 12, and wherein said polymeric foam is an open celled foam.

14. A system for transporting a tower, having a first end, a second end, and an elongated portion therebetween, on a railcar having a deck for carrying a load, the system comprising:
- a first support means for disposition between the railcar and the tower at a first location, and adapted to support the tower above the deck;
- a first saddle assembly having a base for resting upon the deck of the railcar, and a saddle that conforms to the shape of a large tower, said saddle assembly adapted to support the tower above the deck, and
- a plastic spacer assembly, for disposition between said saddle of said first saddle assembly at a second location along the elongated portion of the tower, and having a saddle rest that conforms to the shaped of said saddle, and a spacer saddle that conforms to the shape of the elongated portion of the tower at said second location, and wherein
- said plastic spacer assembly further comprises an impermeable cover.

15. The system of claim 14, and wherein said impermeable cover is formed as a sleeve enclosing at least a portion of said plastic spacer assembly.

16. The system of claim 15, and wherein said at least a portion of said plastic spacer assembly is a compressible portion.

17. The system of claim 14, and wherein said impermeable cover further comprises at least a first tie-down fastener.

* * * * *